United States Patent [19]

Andre et al.

[11] Patent Number: 5,051,492
[45] Date of Patent: Sep. 24, 1991

[54] POLYETHER RESINS AND PROCESS FOR PREPARING THE SAME

[75] Inventors: Olivier L. P. Andre; Henricus P. H. Scholten, both of Ottignies-Louvain-la-Neuve, Belgium

[73] Assignee: Shell Oil Company, Houston, Tex.

[21] Appl. No.: 540,422

[22] Filed: Jun. 19, 1990

[51] Int. Cl.$^5$ ............................................. C08G 65/22
[52] U.S. Cl. .................................. 528/361; 528/410; 528/412; 528/414; 560/240; 560/263
[58] Field of Search ............... 528/361, 410, 412, 414; 560/240, 263

[56] References Cited

U.S. PATENT DOCUMENTS

| | | | |
|---|---|---|---|
| 2,933,459 | 4/1960 | Gurgiolo | 260/2 |
| 3,117,099 | 1/1964 | Proops et al. | 528/316 |
| 3,201,360 | 8/1965 | Proops et al. | 528/361 X |
| 3,208,955 | 9/1965 | Proops | 528/361 |
| 3,242,103 | 3/1966 | Uelzmann | 528/361 X |
| 3,284,383 | 11/1966 | Proops | 528/361 |
| 4,232,135 | 11/1980 | Bentley et al. | 525/509 |
| 4,282,387 | 4/1981 | Olstowski et al. | 568/618 |
| 4,326,047 | 4/1982 | Yates | 525/507 |
| 4,755,583 | 7/1988 | Scholten et al. | 528/110 |

FOREIGN PATENT DOCUMENTS

| | | |
|---|---|---|
| 135395 | 2/1976 | Japan. |
| 297366 | 6/1986 | Japan. |
| 1531778 | 11/1978 | United Kingdom. |

Primary Examiner—Earl Nielsen

[57] ABSTRACT

A process for the preparation of a polyether resin having an epoxy group content of less than 0.2 meq/g and containing or average $n/3 - 0.5$ to $n/3 + 2.5$ primary hydroxyl groups, the process comprising reacting a glycidyl ester of a $C_{9-11}$ branched aliphatic acid with an aliphatic primary polyhydric alcohol having n primary hydroxyl groups and 5 to 16 carbon atoms, n having a value of 3 to 6, in the presence of an etherification catalyst selected from a tin, zinc or iron compound.

16 Claims, No Drawings

POLYETHER RESINS AND PROCESS FOR PREPARING THE SAME

BACKGROUND OF THE INVENTION

This invention relates to polyether resin compositions, a process for preparation thereof, coating compositions containing said polyether resins, a coating process employing said compositions and cured films obtained by use of these compositions.

European patent specification 3166 discloses a process in which a glycidyl ester of a mixture of $C_{9-11}$ branched aliphatic acids was reacted at 100° C. with trimethylolpropane (hereinafter "TMP") in a glycidyl/primary hydroxyl group equivalent ratio of 2:3, in the presence of 0.5% wt based on glycidyl ester, of a boron trifluoride etherate etherification catalyst. However, side reactions between the alcohols, the glycidyl ester, and secondary hydroxyl groups take place in the presence of this boron trifluoride etherate catalyst. With gel permeation chromatography (GPC), the product using the process in the European patent specification has been found to contain several side products. These products are dark colored and contain a high number of compounds in which only one primary hydroxyl group has reacted and a high number of compounds in which all three primary hydroxyl groups have reacted, which is reflected in a combination of relatively high average molecular weight and a broad molecular weight distribution. These products have been found to be less suitable for coating applications because of the undesirable phenomenon of cratering.

It is therefore an object of the invention to provide a process for preparing polyether resins suitable for coating applications. It is another object of the invention to provide a coating free of cratering. It is another object of the invention to provide polyether films which have very good properties suitable for general industrial stoving applications.

BRIEF SUMMARY OF THE INVENTION

According to the invention, a process for the preparation of a polyether resin having an epoxy group content of less than 0.2 meq/g and containing on average from $n/3-0.5$ to $n/3+2.5$ primary hydroxyl groups is provided, the process including contacting a glycidyl ester of a $C_{9-11}$ branched aliphatic acid with an aliphatic primary polyhydric alcohol having n primary groups and 5 to 16 carbon atoms in which n is a value from 3 to 6, in the presence of tin, zinc or iron etherification catalyst.

DETAILED DESCRIPTION OF THE INVENTION

In order to provide resin systems that are suitable for coating applications, it has been found that polyether resins can be prepared that have improved color and narrow molecular weight distribution, and are essentially free from unreacted primary alcohol starting materials and substantially free from unconverted epoxy groups. Accordingly, the present invention provides a process for the preparation of a polyether resin having an epoxy group content of less than 0.2 meq/g and containing on average from $n/3-0.5$ to $n/3+2.5$ primary hydroxyl groups, by allowing a glycidyl ester of a $C_{9-11}$ branched aliphatic acid to react with an aliphatic primary polyhydric alcohol having n primary groups and 5 to 16 carbon atoms in which n is a value from 3 to 6, in the presence of an etherification catalyst in which is a tin, zinc or iron compound.

In a preferred embodiment, the relative amount of starting material is such that the resin contains essentially no free reactants. The preferred relative amounts as expressed by the mole ratio of glycidyl ester to alcohol are within the ranges of about 1:0.4 to 1:2.0 when n is 3; about 1:0.45 to 1:0.7 when n is 4; about 1:0.45 to 1:0.65 when n is 5; and about 1:0.4 to 1:0.6 when n is 6. Accordingly, sufficient primary hydroxyl groups will remain in the final product to ensure that the latter provides for adequate performance in curing.

Surprisingly, it was found that by properly choosing an etherification catalyst, resins were obtained which displayed low cratering in the cured resin. It is believed that the catalysts employed in this invention process selectively support the reaction of the glycidyl ester with a primary hydroxyl group, thereby avoiding unwanted reactions between alcohols, between glycidyl esters, or between glycidyl esters and secondary hydroxyl groups. In contrast to a resin prepared by boron trifluoride etherate catalyst, the process of this invention leads to selective production of derivatives in which the proportion of the converted primary hydroxyl groups can be set at predetermined values. These values are preferably 2 when converting trihydric alcohols, 3 for tetrahydric alcohols and 3 or 4 for pentahydric or hexahydric alcohols.

Suitable examples of etherification catalysts include halides, and salts of alkanoic and naphtenic acids, particularly those having in the range from 2 to 30 carbon atoms per molecule. Suitable catalysts include tin, zinc, or iron salts such as tin, zinc or iron chlorides, tin or zinc alkanoates, dibutyltin dialkanoates and iron salts of naphtenic acids. Preferred catalysts are tin(II)octoate, tin dichloride, dibutyltin dilaurate and tin tetrachloride, the former being most preferred.

The catalyst may be employed at relatively low amounts and low reaction temperatures. Thus, addition of about 0.01 to 0.4% m/m of catalyst while heating the reaction mixture to a temperature in the range from about 100° to 200° C. is adequate. Particularly suitable amounts of catalyst range from about 0.03 to 0.35% m/m, most suitably from about 0.05 to 0.2% m/m. The reaction may conveniently be carried out at a temperature in the range of about 115° to 190° C., preferably from about 130° to 175° C.

The aliphatic primary tri-to hexahydric alcohol to be reacted contains three to six primary hydroxyl groups (i.e., $HOCH_2-$), optionally one or more ether links, and preferably no other secondary ($HOCH-$) or tertiary ($HOC-$) hydroxyl groups. Suitable compounds are any of the isomers corresponding to tri(hydroxymethyl)ethane, —propane, —butane, —pentane, —hexane, —heptane, —octane, and —nonane; tetra(hydroxymethyl)methane, —ethane, —propane, —butane, —pentane, —hexane, —heptane, and —octane; penta(hydroxymethyl)—ethane, —propane, —butane, —pentane, —hexane, and —heptane; and hexa(hydroxymethyl)ethane, —propane, —butane, —pentane, and —hexane. Also suitable are the dimers or ethylene oxide modified derivatives of the compounds above, however, with the proviso that the total amount of primary hydroxyl groups is from 4 to 6, and the total amount of carbon atoms is from 5 to 16. The aliphatic tri- to hexahydric primary alcohol in this application also includes aliphatic alcohols having one or more non-conjugated unsaturated links.

In a preferred embodiment, the aliphatic primary alcohol is TMP or the dimer of TMP (DTMP). The most preferred aliphatic primary alcohol is TMP, melting at 58° C. and being a solvent for the relevant glycidyl ester reactant.

The polyether resins are suitable for use in high-performance automotive high solids topcoats. Attractive cross-linking resins in this respect are for example those disclosed in U.S. Pat. No. 4,755,583, which are incorporated herein by way of reference. Particularly suitable cross-linking agents are the amino-plast-type resins, such as alkoxylated reaction products of formaldehyde with melamine or benzoguanamide. Other suitable cross-linking agents include urea-aldehyde resins, phenol-aldehyde resins, and blocked polyisocyanates. Suitable catalysts which may be employed in the curable coating compositions are acids such as orthophosphoric acid or p-toluenesulphonic acid. For example, these catalysts may be used in an amount in the range of from about 0.05 to 2% by weight calculated on polyether and cross-linking resin. The relative proportions of polyether resin and curing agent are those generally employed in the curable binders, typically of from about 5 to 50% by weight, calculated on the total of polyether resin and cross-linking resin.

The curable coating composition can be applied by a variety of known methods such as by spraying, dipping or roller coating. The coatings can be hardened by stoving, for example at temperatures ranging from about 100° to 300° C., with curing temperatures varying from about 10 seconds to 30 minutes.

The polyether resins of this invention are primarily intended to be employed in surface coatings. Other applications such as in laminates or castings are also possible. The resins may be blended with conventional solvents such as aliphatic or aromatic hydrocarbons.

Pigments, fillers, dispersing agents and other components known for coating formulations may be added to the curable binder system comprising the polyethers made in accordance with the process of this invention.

The invention will be further understood from the following examples.

EXAMPLE 1

The experiment was carried out in a 1 liter glass reactor equipped with a stainless steel stirrer, nitrogen inlet, heating mantle, a thermocouple and a reflux condensor.

First, 1 mole TMP and 2 mole CARDURA E10 (a mixture of $C_{9-11}$ branched aliphatic acids, hereinafter "CE10", registered trademark) were charged into the reactor and homogenized by gradually increasing the temperature. When the system was homogenized, normally at about 100° C., a catalyst was added. Then, the reactor was heated to the desired reaction temperature. The reaction was followed by withdrawing samples at regular intervals and determining the decreasing epoxy group content (EGC) value. The reaction was stopped by cooling. Experimental data are summarized in Table 1.

The resins prepared with tin(II)octoate and boron trifluoride etherate were further evaluated in lacquer formulations of the following compositions:

| Lacquer composition | I (g) | II (g) |
|---|---|---|
| Resins | 40.0 | 35.0 |
| Hexamethoxymethylmelamine, "HMMM" | 10.0 | 15.0 |
| Xylene | 12.5 | 12.5 |
| para-toluenesulphonic acid | 1.5 | 1.5 |
| (10% in butylOXITOL; registered trademark) | | |

The clear lacquer was applied onto a bare steel panel in a dry film thickness of approximately 35 μm. The panel was stoved at a temperature of

TABLE 1

| Catalyst | Intake (g) TMP | Intake (g) CE10 | cat. | Temp. (°C.) | Time of reaction (h.) | Colour (Hazen) | MWD Mz/Mw | Mz | Free alcohol (% m/m) | EGC meq/g |
|---|---|---|---|---|---|---|---|---|---|---|
| BF3:OEt2* | 100 | 367 | 1.9 | 100 | 0.80 | 1190 | 1.14 | 800 | 2.0 | 0.04 |
| SnCl4 | 67 | 251 | 0.3 | 160 | 1.50 | 230 | 1.04 | 620 | <<1.5 | 0.08 |
| SnCl2 | 67 | 251 | 0.3 | 160 | 2.00 | 230 | 1.03 | 580 | <<1.5 | 0.09 |
| Sn(II)Oct | 100 | 367 | 0.8 | 160 | 2.00 | 210 | 1.03 | 610 | <<1.5 | 0.07 |

*for comparison

TABLE 2

| Catalyst | Composition | Thickness (um) | MEK (dbl. rubs) | Flexibility (kg · cm) | Hardness Konig | Cratering |
|---|---|---|---|---|---|---|
| BF3:OEt2* | I | 32 | 56 | 35 | 26 | substantial |
|  | II | 35 | >100 | <12 | 122 |  |
| Sn(II)Oct | I | 35 | 42 | 46 | 24 | little to |
|  | II | 34 | >100 | <12 | 143 | negligible |

*for comparison

TABLE 3

| | Intake (g) alc. | Intake (g) CE10 | Sn(II) octoate | Temp. (°C.) | Time of reaction (h.) | Colour (Hazen) | MWD Mz/Mw | Mz | Free alcohol (% m/m) | EGC meq/g |
|---|---|---|---|---|---|---|---|---|---|---|
| TMP | 55 | 200 | 0.55 | 130 | 2.5 | 210 | 1.04 | 610 | >>1.5 | 0.09 |
| | 100 | 363 | 0.76 | 160 | 1.3 | 220 | 1.02 | 610 | >>1.5 | 0.07 |
| | 55 | 200 | 0.15 | 175 | 1.9 | 220 | 1.04 | 610 | >>1.5 | 0.08 |
| THEIC | 98 | 182 | 0.89 | 175 | 1.8 | 890 | 1.08 | 710 | 4 | 0.10 |
| DTMP | 78 | 200 | 0.44 | 145 | 3.8 | 550 | 1.04 | 760 | 3 | 0.10 |
| | 78 | 200 | 0.45 | 160 | 2.1 | 570 | 1.04 | 760 | 2 | 0.09 |
| | 78 | 200 | 0.16 | 175 | 3.8 | 570 | 1.03 | 760 | 2 | 0.08 |

TABLE 4

| | Intake (g) | | Sn(II) octoate | Temp. (°C.) | Time of reaction (h.) | Colour (Hazen) | MWD Mz/Mw | Mz | Free alcohol (% m/m) | EGC meq/g |
|---|---|---|---|---|---|---|---|---|---|---|
| | alc. | CE10 | | | | | | | | |
| TMP | 134 | 502 | 1.0 | 160 | 4.0 | 220 | 1.03 | 590 | >>1.5 | 0.07 |
| DTMP | 250 | 502 | 1.2 | 160 | 4.2 | 570 | 1.04 | 710 | >>1.5 | 0.09 |

140° C. for 30 minutes, after which the lacquer properties were assessed which are shown in Table 2.

EXAMPLE 2

The procedure of Example 1 was repeated using one of the alcohols below and CE10 in a glycidyl/primary hydroxy equivalent ratio of 2:3 in the presence of different amounts of tin(II)octoate. Experimental data of the resin preparation are summarized in Table 3.

| Name | Abbreviation | Functionality |
|---|---|---|
| Trimethylolpropane | TMP | 3 |
| Tri(hydroxyethyl)isocyanurate | THEIC | 3 |
| Di(trimethylolpropane) | DTMP | 4 |

EXAMPLE 3

The procedure of Example 2 was repeated, however, in a glycidyl/primary alcohol mol ratio of 2:1 in the presence of 0.16% m/m of tin(II)octoate. Experimental data of the resin preparation are summarized in Table 4. Moreover, these resins were further evaluated by assessing the lacquer properties of lacquer formulations prepared according to compositions I and II in Example 1. The physical data are summarized in Table 5.

TABLE 5

| Alc. | Composition | Thickness (um) | MEK (dbl. rubs) | Flexibility (kg · cm) | Hardness Konig |
|---|---|---|---|---|---|
| TMP | I | 35 | 42 | 46 | 24 |
| | II | 34 | >100 | <12 | 143 |
| THEIC* | I | 33 | >100 | 23 | 125 |
| | II | 22 | >100 | <12 | 167 |
| DTMP | I | 35 | 90 | 35 | 54 |
| | II | 33 | >100 | <12 | 157 |

*using methylPROXITOL (registered trademark) instead of xylene.

We claim:

1. A process for the preparation of a polyether resin having an epoxy group content of less than 0.2 meq/g and containing on average from n/3−0.5 to n/3+2.5 primary hydroxyl groups, the process comprising contacting a glycidyl ester of a $C_{9-11}$ branched aliphatic acid with an aliphatic primary polyhydric alcohol containing n primary hydroxyl groups and 5 to 16 carbon atoms, wherein n is a value of 3 to 6, in the presence of an etherification catalyst selected from the group consisting of tin, zinc and iron salts.

2. The process of claim 1 wherein the relative amounts of glycidyl ether to alcohol are within the ranges of about 1:0.4 to 1:2.0 when n is 3; about 1:0.45 to 1:0.7 when n is 4; about 1:0.45 to 1:0.65 when n is 5; and about 1:0.4 to 1:0.6 when n is 6.

3. The process of claim 1 wherein said tin salts are selected from the group consisting of halides, salts of alkanoic acids, and salts of naphthenic acids.

4. The process of claim 1 wherein said zinc salts are selected from the group consisting of halides, salts of alkanoic acids, and salts of naphthenic acids.

5. The process of claim 1 wherein said iron salts are selected from the group consisting of halides, salts of alkanoic acids, and salts of naphthenic acids.

6. The process of claim 1 wherein said etherification catalyst is selected from the group consisting of tin chlorides, zinc chlorides and iron chlorides.

7. The process of claim 1 wherein said etherification catalyst is selected from the group consisting of tin alkanoates, zinc alkanoates, and dibutyltin(IV)alkanoates.

8. The process of claim 1 wherein said etherification catalyst is an iron naphthenate.

9. The process of claim 1 wherein said etherification catalyst is tin(II)octoate.

10. The process of claim 1 wherein the primary alcohol is selected from the group consisting of trimethylolpropane and di(trimethylolpropane) ether.

11. The process of claim 1 carried out at a temperature within the range from about 115° to 175° C.

12. A polyether resin product of the process of claim 1 having an epoxy group content of less than 0.2 meq/g and containing on average from n/3−0.5 to n/3+2.5 primary hydroxyl groups.

13. A curable coating composition comprising the polyether resin of claim 12 and a cross-linking resin.

14. A process for coating a surface comprising the steps of applying the curable coating composition of claim 13 to a surface and curing by action of heat.

15. The process of claim 1 in which the primary alcohol is selected from the group consisting of trimethylolpropane and di(trimethylolpropane) ether, and the etherification catalyst is tin(II)octoate.

16. A lacquer composition comprising the polyether resin product of claim 15, hexamethoxymethylmelamine, xylene, and para-toluenesulfonic acid.

* * * * *